UNITED STATES PATENT OFFICE.

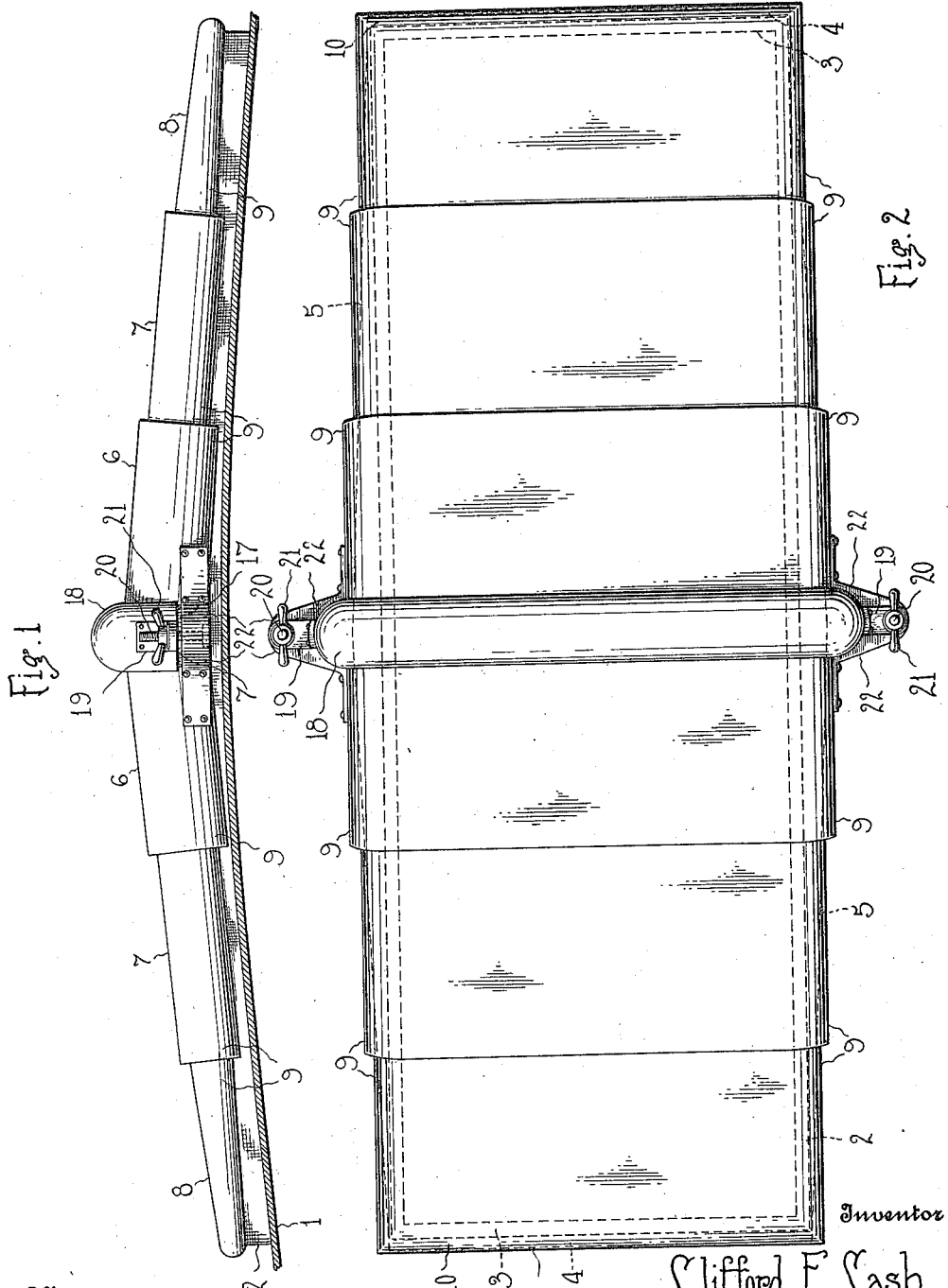

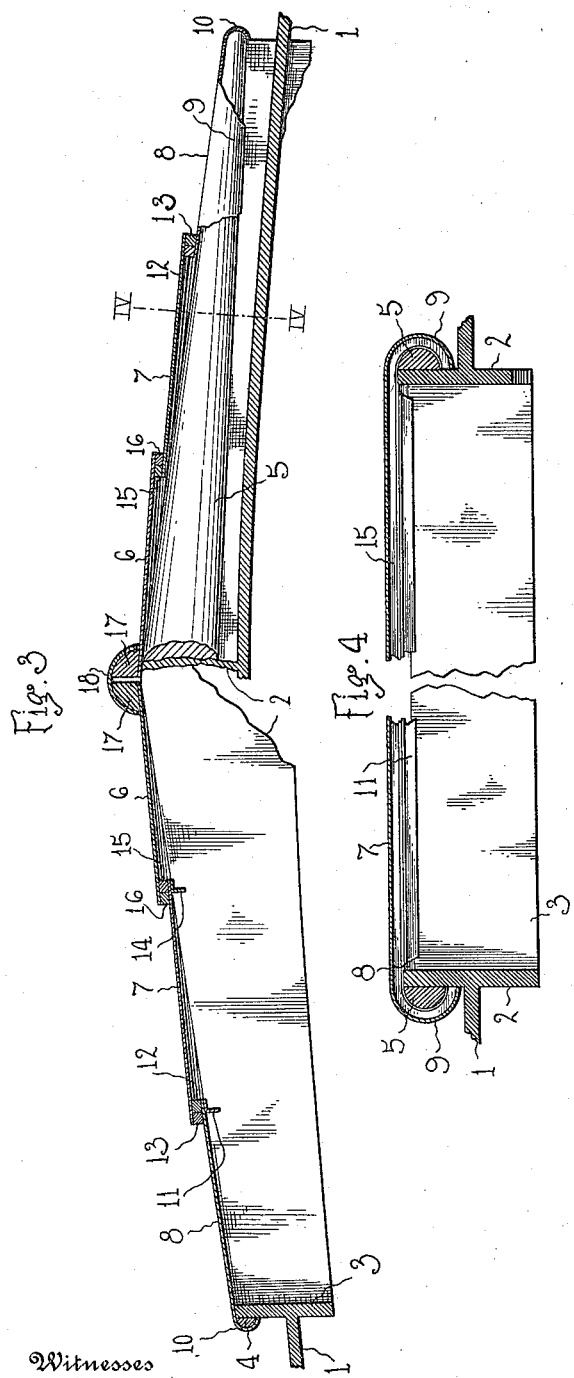

CLIFFORD E. CASH, OF DETROIT, MICHIGAN.

HATCH-COVER.

1,152,486.  Specification of Letters Patent.  Patented Sept. 7, 1915.

Application filed March 15, 1915. Serial No. 14,557.

*To all whom it may concern:*

Be it known that I, CLIFFORD E. CASH, a citizen of the United States of America, residing at Detroit, in the county of Wayne and State of Michigan, have invented certain new and useful Improvements in Hatch-Covers, of which the following is a specification, reference being had therein to the accompanying drawings.

This invention relates to a hatch cover, and the primary object of my invention is to provide a collapsible or foldable cover that will occupy a comparatively small space when not in use, the cover having provision whereby it can be easily and quickly extended to completely cover a hatch without danger of the cover becoming accidentally displaced due to internal explosions, or movement of a hatch.

A further object of this invention is to provide a hatch cover that can be advantageously used in connection with freight boats, seagoing vessels, and structures that have hatchways that must be closed to prevent foreign matter and water from injuring a cargo, the cover having special provision whereby the same can be firmly secured to the walls of a hatchway and water or other matter shed from the same.

The above and other objects are attained by a mechanical construction having parts made with a view of reducing the cost of manufacture and at the same time retaining the features by which durability, simplicity and ease of fabrication are secured, and with such ends in view, my invention resides in the novel construction, combination and arrangement of parts to be hereinafter specifically described and then claimed.

Reference will now be had to the drawings, wherein—

Figure 1 is a side elevation of a hatch cover in accordance with this invention; Fig. 2 is a plan of the same; Fig. 3 is a longitudinal sectional view of the hatch cover; Fig. 4 is a cross sectional view, taken on or about the line IV—IV of Fig. 3; Fig. 5 is a perspective view of a detached telescopic member of the hatch cover, and Fig. 6 is a perspective view of a detached coupling member.

In describing my invention by aid of the views above referred to, I desire to point out that the same are intended as merely illustrative of an example whereby my invention may be applied in practice, and I do not care to confine my invention to the precise construction and arrangement of parts shown. The following description is therefore to be broadly construed as including substitute constructions and arrangements of parts which are the obvious equivalent of those to be hereinafter referred to.

In the drawings, 1 denotes the deck of a vessel as having an oblong hatchway formed by longitudinal side walls 2 and end walls 3, said side walls having the upper edges thereof inclined from a point intermediate the ends of said side walls outwardly to the end walls 3. The end walls 3, at the upper edges thereof and at the outer sides, have beads 4 and the outer sides of the walls 2, at the upper edges thereof have beads or rails 5, said rails being semi-cylindrical in cross section and tapering from a point intermediate the ends thereof to the end walls 3.

Slidable upon the rails 5 and removable therefrom is a sectional cover for the hatchway, said cover consisting of two sections and each section being composed of inner members 6, intermediate members 7 and outer members 8, the members 6, 7, and 8 being telescopic whereby each section of the cover can be collapsed to occupy a comparatively small space either at each end of the hatchway or when completely removed.

All of the members of the sectional hatch cover have curved inturned side edges 9 which embrace the rails 5 and guide the members, besides preventing vertical displacement of the sections of the cover, particularly after the sections have been connected together. In addition to the curved inturned edges 9 of said members, the outer members 8 have curved inturned edges 10 adapted to embrace the beads 4 of the end walls 3. The upper or inner edges of the members 8 are stiffened and reinforced by transverse angle bars 11 and these same edges are provided with transverse cleats 12 adapted to be engaged by depending transverse cleats 13 carried by the outer or lower edges of the intermediate members 7.

The upper or inner edges of the intermediate members 7 are provided with angle bars 14 and cleats 15 and the latter are adapted to be engaged by cleats 16 carried by the lower or outer edges of the inner members 6. The inner or confronting edges of the members 6 are provided with transverse beads 17 extended on to the curved inturned edges of the members 6, as best shown in Fig. 1. These beads, when in proximity to each other, provide a semi-cylindrical structure transversely of the sectional cover adapted to receive a semi-cylindrical or channel shaped coupling member 18, which can be easily fitted over the beads 17 to couple the sections of the cover together. The depending ends of the coupling member 18 are provided with angle brackets 19 and depending from said brackets are bolts 20 retained in engagement with the brackets by winged thumb nuts 21.

The confronting ends of the inner members 6, at the sides thereof, have confronting brackets 22 and the bolts 20 are adapted to extend between said brackets with the heads 23 thereof engaging under and between the brackets whereby the coupling member 18 can be clamped upon the beads 17. To facilitate attaching the brackets 22 to the inner members 6, the sides of the members, or portions of their length, are straight thereby presenting vertical walls to which the brackets 22 can be easily attached.

To remove the hatch cover, the nuts 21 and the bolts 20 are removed, then the coupling member 18, and then the inner members 6 are shifted outwardly upon the intermediate members 7 and then both of said members shifted outwardly on to the outer members 8. Here the telescopic members may rest if a cargo can be placed in the hatchway, but if it is necessary to have a large area, the telescopic members can be completely removed.

In placing the sectional cover upon the hatchway, the outer members 8 are placed in position and then the superimposed members 7 and 6 shifted inwardly until the beads 17 confront to receive the coupling member 18. It is then an extremely easy matter to secure the coupling member in place and it is practically impossible for water to enter the hatchway.

The telescopic members of the cover can be made of light and durable metal painted or otherwise finished to render the same non-corrodible, and while I have herein illustrated and described each section of the cover as being composed of three telescopic members, it is apparent that two or more members may compose each section; the number and size of the members depending upon the area of the hatchway.

What I claim is:—

1. A hatch cover comprising sections and each section composed of telescopic members, the confronting ends of the innermost members of said sections, and means adapted for holding said coupling member relative to a coupling member adapted to fit over said cover.

2. A hatch cover comprising sections each composed of telescopic members, beads carried by the innermost members of said sections, a coupling member adapted to be fitted over said beads, and means adapted to connect the ends of said coupling member to the innermost members of said sections.

In testimony whereof I affix my signature in presence of two witnesses.

CLIFFORD E. CASH.

Witnesses:
ANNA M. DORR,
CHAS. W. STAUFFIGER.

Copies of this patent may be obtained for five cents each, by addressing the "Commissioner of Patents, Washington, D. C."